(12) United States Patent
Ellenrieder et al.

(10) Patent No.: US 8,657,954 B2
(45) Date of Patent: Feb. 25, 2014

(54) ALKALI-ACTIVATED ALUMINOSILICATE BINDER CONTAINING GLASS BEADS

(75) Inventors: Florian Ellenrieder, Augsburg (DE); Michael McIlhatton, Ausburg (DE); Adolf Hagner, Gersthofen (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/642,761

(22) PCT Filed: Apr. 12, 2011

(86) PCT No.: PCT/EP2011/055702
§ 371 (c)(1),
(2), (4) Date: Nov. 27, 2012

(87) PCT Pub. No.: WO2011/134783
PCT Pub. Date: Nov. 3, 2011

(65) Prior Publication Data
US 2013/0206033 A1    Aug. 15, 2013

(30) Foreign Application Priority Data

Apr. 26, 2010   (EP) .................................... 10161010

(51) Int. Cl.
*C04B 14/22*   (2006.01)
*C04B 28/00*   (2006.01)
*C09D 5/34*    (2006.01)

(52) U.S. Cl.
USPC ........... 106/814; 106/632; 106/634; 106/705; 106/706; 106/710; 106/789; 106/790; 106/811

(58) Field of Classification Search
USPC ......... 106/705, 706, 710, 789, 791, 632, 634, 106/811, 814
See application file for complete search history.

(56) References Cited

U.S. PATENT DOCUMENTS

| 6,296,699 B1 * | 10/2001 | Jin ................................. 106/814 |
| 2006/0142456 A1 * | 6/2006 | Langford ....................... 524/424 |
| 2007/0104859 A1 * | 5/2007 | Featherby et al. .............. 427/2.1 |

FOREIGN PATENT DOCUMENTS

| DE | 197 02 254 A1 | 7/1998 |
| DE | 20 2005 020 825 U1 | 3/2007 |
| DE | 10 2008 004 004 A1 | 7/2009 |
| EP | 0 921 106 A1 | 6/1999 |
| EP | 0 980 854 A1 | 2/2000 |
| EP | 1 236 702 A1 | 9/2002 |
| EP | 1 666 430 A2 | 6/2006 |
| GB | 2425532 A * | 11/2006 |
| WO | WO 2008/017414 A1 | 2/2008 |

OTHER PUBLICATIONS

PCT/EP2011/055702—International Search Report, Aug. 23, 2011.
PCT/EP2011/055702—International Written Opinion, Aug. 23, 2011.
PCT/EP2011/055702—International Preliminary Report on Patentability, Oct. 30, 2012.
Buchwald, A., "Geopolymere Bindernittel—Geopolymer Binders", Materials Science, SKG International, Gertersloh, Germany, Dec. 1, 2007, vol. 60, No. 12, pp. 78-84.
Skvara, F., "Alkali Activated Materials or Geopolymers?" Ceramics—Silikaty, Czech Republic, vol. 51, No. 3, Mar. 1, 2007, pp. 173-177.

* cited by examiner

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The invention relates to a mixture containing an alkali-activated aluminosilicate binder, said mixture, after hardening, containing at least 25% by weight of glass beads, based on the total mass. The hardened product has a surface which has very little tendency to soil and is easy to clean. A process for the preparation of the mixture according to the invention and the use thereof as joint filler are disclosed.

13 Claims, No Drawings

ALKALI-ACTIVATED ALUMINOSILICATE BINDER CONTAINING GLASS BEADS

CROSS REFERENCE TO RELATED APPLICATIONS

This application is a national stage application of International Application No. PCT/EP2011/055702, filed 12 Apr. 2011, which claims priority from European Patent Application No. 10161010.3, filed 26 Apr. 2010, from which applications priority is claimed, and which are incorporated herein by reference.

The present invention relates to a mixture containing an alkali-activated aluminosilicate binder which, after hardening, contains at least 25% by weight of glass beads, a process for the preparation of the mixture and the use of the mixture according to the invention as joint mortar.

Alkali-activated aluminosilicate binders are cement-like materials which are formed by reacting at least two components. The first component is a reactive solid component which contains $SiO_2$ and $Al_2O_3$, e.g. fly ash or metakaolin. The second component is an alkaline activator, e.g. sodium waterglass or sodium hydroxide. In the presence of water, the contact of the two components results in hardening by formation of an amorphous to semicrystalline aluminosilicate network which is water-resistant.

The process of hardening takes place in solutions having pH values above 12 and differs from the hydration process of inorganic binders, such as, for example, of Portland cement. In this process, which takes place predominantly via the "solution", Al atoms (and probably also the Ca and Mg atoms) are incorporated into the original silicate lattice of the reactive solid component. The properties of the products produced by this method are dependent in particular on the concentration of the alkaline activator and the moisture conditions.

Alkali-activated aluminosilicate binders were investigated as early as the 1950s by Glukhovsky. The interest of the industry in these binders has increased considerably in the past years owing to the interesting properties of these systems. Alkali-activated aluminosilicate binders permit strengths which can exceed those of standard Portland cements. Furthermore, these systems harden very rapidly and have very high resistance to chemicals and thermal stability.

EP 1 236 702 A1 describes, for example, a waterglass-containing construction material mixture for the production of mortars resistant to chemicals and based on a latently hydraulic binder, waterglass and metal salt as a control agent. Slag sand can also be used as the latently hydraulic constituent. Alkali metal salts are mentioned and used as the metal salt.

An overview regarding the substances suitable as alkali-activatable aluminosilicate binders is given by the literature reference Alkali-Activated Cements and Concretes, Caijun Shi, Pavel V. Krivenko, Della Roy, (2006), 30-63 and 277-297.

WO 2008/017414 A1 describes a pumpable geopolymer formulation for oil field applications. The formulation is distinguished by a controllable thickening and hardening time which is maintained over a wide temperature range. In addition to numerous other fillers, the use of glass beads is also proposed.

EP 1 666 430 A1 describes a joint filling material, in particular joint mortar, which comprises a binder and an aggregate, the aggregate substantially comprising glass beads. In the case of the binders, in particular transparent binders, such as, for example, epoxy resins or acrylates, are used. The joint filler can be relatively easily processed and cleaned.

Dirt-repellent and easy-to-clean surfaces are of considerable interest in many applications. The dirt-repellent surfaces used according to the prior art may be either superhydrophobic or superhydrophilic. In the case of the superhydrophobic surfaces, the contact area and hence the adhesive force between surface and particles or water lying on it is so greatly reduced that self-cleaning occurs. This property is also known as the lotus effect. In contrast, in the case of hydrophilic systems, the surface is such that an extremely high surface energy (high adhesion) occurs and the water contact angle is less than 1°. As a result, water is distributed over a large area on the surface so that dirt can be washed away and is thus easily detached. As a result, dirt can easily be washed off the surface. The application of finely crystalline titanium dioxide (anatase modification) to ceramic surfaces should be mentioned here by way of example for the production of hydrophilic surfaces. However, the known hydrophilic and hydrophobic systems frequently have only a limited mechanical resistance, which limits their duration of action.

The known surfaces according to the prior art therefore still do not have optimum properties with regard to their tendency to soil and the cleanability.

It was therefore an object of the present invention to provide a binder system which, after hardening, forms a surface having very little tendency to soil. The surface should furthermore be easy to clean and the effect of the little tendency to soil should also be maintained over a long period. Furthermore, the binder system should be easy to process and, after hardening, should have a high strength. In particular, the binder system according to the invention should be suitable as a joint filling material and in particular joint mortar.

This object was achieved by a mixture containing an alkali-activated aluminosilicate binder, said mixture, after hardening, containing at least 25% by weight of glass beads, preferably at least 35% by weight of glass beads, in particular at least 45% by weight of glass beads, particularly preferably at least 55% by weight of glass beads, based on the total mass.

Apart from the fact that the object could be completely achieved with regard to all specifications, it has surprisingly been found that the system according to the invention has outstanding surface optical properties even after long standing times. Furthermore, the surface can be easily cleaned even without the use of aggressive cleaning agents, making a positive contribution to the relief of the environment. As a rule, the use of water is sufficient for cleaning.

In particular, at least one aluminosilicate from the series consisting of the natural aluminosilicates and/or synthetic aluminosilicates, in particular slag sand powder, microsilica, trass powder, oil shale, metakaolin, fly ash, in particular of type C and type F, blast furnace slag, aluminium-containing silica dust, pozzolanes, basalt, clays, marl, andesites, diatomaceous earth, kieselguhr or zeolites, particularly preferably slag sand powder, fly ash, microsilica, slag, clay and metakaolin, can be used as the solid component which contains $SiO_2$ and $Al_2O_3$. The binder according to the invention contains this solid component preferably in an amount of 5 to 70% by weight, preferably of 10 to 50% by weight and in particular of 15 to 30% by weight, mixtures also being possible. For the hardening reaction of the alkali-activated aluminosilicate binders, in particular the ratio of silicon atoms to aluminium atoms is of considerable importance. In the system according to the invention, a ratio of silicon atoms to aluminium atoms of between 30 and 1.0 has proved to be advantageous, a ratio between 6 and 1.5 and in particular between 1.8 and 2.2 and between 4.7 and 5.3 being preferred.

A suitable alkaline activator is in particular a compound from the series consisting of sodium waterglass, potassium waterglass, lithium waterglass, ammonium waterglass, sodium hydroxide, potassium hydroxide, sodium carbonate, potassium carbonate, alkali metal sulphates, sodium metasilicate, potassium metasilicate, preferably potassium waterglass. According to the invention, the alkaline activator is preferably present in an amount of 0.1 to 50% by weight, preferably of 2 to 25% by weight and in particular of 5 to 20% by weight, mixtures of these compounds also being possible.

The shape of the glass beads is not subject to any substantial limitations. These may have, for example, elliptical, droplike or spherical form, the glass beads preferably having a smooth surface. Preferably, the glass beads are solid glass beads, in particular solid glass spheres. Glass beads having a diameter between 0.01 and 5 mm, in particular between 0.05 and 2 mm, particularly preferably between 0.1 and 1 mm, have proved particularly suitable. In the case of the non-spherical glass beads, the diameter relates to the greatest measurable diameter of the beads in each case. A mixture of glass beads having different diameters is preferably used in order to achieve as smooth a surface as possible. The glass material used is not subject to any special limitations, provided that it is compatible with the binder. Suitable glass is in particular A, C, E and AR glass. E and AR glass is particularly suitable.

The system according to the invention may additionally contain at least one filler, plastic, additive and/or pigment component as further constituents. Furthermore, hardening accelerators, such as aluminium phosphate, antifoams, rheology modifiers and dispersants are suitable as an additive component. Preferably, the total mixture contains from 0.01 to 50% by weight of at least one of these further constituents and in particular from 0.3 to 30% by weight.

Plastic component is to be understood as meaning in particular redispersible polymer powders or, in the case of 2-component binders, also liquid dispersions which are preferably composed of at least one representative of the series consisting of vinyl acetate, acrylate, styrene, butadiene, ethylene, vinyl versatate, urea-formaldehyde condensates and melamine-formaldehyde condensates and, for example, polyethylene fibres or polypropylene fibres. For example, titanium dioxide can be used as the pigment component.

In the case of fillers, inter alia crushed rock, basalts, clays, feldspars, mica powder, glass powder, quartz sand or quartz powder, bauxite powder, aluminium hydroxide and wastes of the alumina, bauxite or corundum industry, ashes, slags, amorphous silica, limestone and mineral fibre materials are suitable. Light fillers, such as perlite, kieselguhr (diatomaceous earth), expanded mica (vermiculite) and foamed sand, can also be used. Fillers from the series consisting of limestone, quartz and amorphous silica are preferably used.

In a preferred embodiment, between 2 and 60% by weight of water are present in the mixture according to the invention and in particular from 5 to 40% by weight.

For reducing the water/binder ratio, plasticizers and/or superplasticizers may furthermore be added to the system. In particular, amounts of 0.1 to 3% by weight are to be regarded here as being preferred.

The mixture according to the invention is also suitable for use in combination with inorganic or hydraulic or mineral binders, such as cement, in particular Portland cement, Portland slag cement, Portland silica dust cement, Portland pozzolana cement, Portland fly ash cement, Portland shale cement, Portland limestone cement, Portland composite cement, blast furnace cement, pozzolana cement, composite cement, cement having a low heat of hydration, cement having high sulphate resistance, cement having a low effective alkali content and quicklime, gypsum ($\alpha$-hemihydrate, $\beta$-hemihydrate, $\alpha/\beta$-hemihydrate) and anhydrite (natural anhydrite, synthetic anhydrite, FGD anhydrite). The ratio of the alkali-activated inorganic binder used to the inorganic or hydraulic or mineral binder can be varied within wide ranges. In particular, ratios of 1:100 to 100:1, preferably 1:20 to 20:1 and in particular 3:1 to 1:3 have proved particularly advantageous. However, the system preferably contains no further inorganic or hydraulic or mineral binders.

In a preferred embodiment, the mixture according to the invention containing an alkali-activated aluminosilicate binder contains the following components:

| | |
|---|---|
| 15 to 60% by weight | of reactive solid component (containing $SiO_2$ and $Al_2O_3$) |
| 1 to 40% by weight | of alkaline activator |
| 25 to 70% by weight | of glass beads |
| 0 to 80% by weight | of fillers |
| 5 to 40% by weight | of water |

In a particularly advantageous embodiment, the mixture contains

| | |
|---|---|
| 15 to 35% by weight | of reactive solid component (containing $SiO_2$ and $Al_2O_3$) |
| 1 to 20% by weight | of alkaline activator |
| 45 to 65% by weight | of glass beads |
| 0 to 40% by weight | of fillers |
| 7 to 15% by weight | of water |

In a preferred embodiment, it is possible to mix powdery alkaline activators according to one of the preferred embodiments of the invention with the reactive solid component or thus to coat the reactive solid component and optionally the glass spheres. This gives a 1-component system (1-C system) which can subsequently be activated by the addition of water.

2-Component systems (2-C systems) are characterized in that a preferably aqueous alkaline activator solution is added to the reactive solid component. Once again, the alkaline activators according to the preferred embodiment of the invention are suitable here. It is preferable here that the glass beads according to the invention are used with the reactive solid component.

The present invention furthermore relates to a process for the preparation of a mixture according to the invention containing an alkali-activated aluminosilicate binder. According to the invention, the process is characterized in that the reactive solid component, the alkaline activator, glass beads and water and optionally further components are homogeneously mixed with one another. The sequence of addition of the components is not critical but it has proved to be advantageous initially to introduce water and the alkaline activator and then to add the reactive solid component and the glass beads. The process can be carried out both batchwise and continuously, suitable apparatuses being static mixers, extruders, Rilem mixers and drills having stirrer attachments. By stirring the combined liquid and solid constituents, the binder is activated, which hardens the mortar. In the case of the 1-component systems, the mixture according to the invention need only be homogeneously mixed with water.

The mixture according to the invention containing an alkali-activated aluminosilicate binder is preferably used as joint filler and in particular joint mortar. The present invention therefore furthermore relates to a joint mortar based on an alkali-activated aluminosilicate binder, said joint mortar, after hardening, having at least 25% by weight of glass beads, preferably at least 35% by weight of glass beads, in particular at least 45% by weight of glass beads, particularly preferably at least 55% by weight of glass beads, based on the total mass.

For the production of such joint fillers and in particular joint mortars, the mixture described above is usually mixed with further components, such as fillers, latently hydraulic substances and further additives. The addition of the powdery alkaline activator is preferably effected before said components are mixed with water, so that a so-called dry-mix mortar is produced. Thus, the alkaline activation component is present in powdery form, preferably as a mixture with the reactive solid component, glass beads and optionally fillers (1C system). Alternatively, the aqueous alkaline activator can be added to the other powdery components. However, it is also possible first to mix the powdery components with water and then to add the alkaline activator. In these cases, the two-component binder system (2-C system) is then referred to.

Furthermore, the use of glass beads in a joint mortar which comprises an alkali-activated aluminosilicate binder for reducing the tendency of the joint produced to soil is claimed with the present invention.

The mixture according to the invention can also advantageously be used as screed, coating, render, paint, road marking and in particular as anti-graffiti coating.

The present invention furthermore relates to a hardened product which comprises the mixture according to the invention containing an alkali-activated aluminosilicate binder and at least 25% by weight of glass beads, based on the total mass. The mixture according to the invention is preferably hardened at between −10 and 90° C. Depending on the composition, very good strengths are achieved after only a few hours, so that the articles produced, in particular joints, ensure virtually full load capacity in most cases after only 4 to 10 hours. In a particular embodiment, the hardened product is a joint filling.

The system according to the invention has good workability and the hardened product has a superhydrophilic surface and a high resistance to chemicals, durability and thermal stability. The low tendency of the surfaces to soiling is retained virtually unchanged even over a very long period. Furthermore, joints which are produced from the mixture according to the invention have a good surface appearance.

The following examples and the test method illustrate the advantages of the present invention.

EXAMPLES

Test Method:

All powdery substances are homogenized and then mixed with the liquid component. In the examples which contain only powdery constituents, the mixing liquid is water. In the case of 2-component mixtures, the alkaline activator is added separately, said activator then being the liquid component here.

The mixtures are stirred for about one minute until a homogeneous, lump-free mass forms. After a maturing time of three minutes, the mortars are stirred again and introduced onto a concrete slab tiled with porcelain stoneware.

After a hardening time of 7 days under standard climatic conditions, soiling tests are carried out with a staining agent according to DIN EN 14411. The staining agent is a mixture of rust and mineral oil. The stain is applied in the form of drops both to the tiles and to the hardened joint mortars. For this purpose, the same number of drops of the staining agent is applied per sample area. The staining agent is left for 10 minutes on the soiled surface. The slabs treated in this manner are then stored under water for 10 minutes. After removal from the water bath, the pointed tile surfaces are freed from excess water by pouring off and the degree of soiling is assessed. In an additional step, remaining soiling residues can also be subsequently cleaned using a hand brush. The assessment of the removability of the test medium can be carried out in the following levels:

++ very readily removable (residue-free without mechanical assistance)+

+ readily removable (residue-free with mechanical assistance)

○ partly removable (residue without mechanical assistance)

− scarcely removable (residue with mechanical assistance)

−− not removable (staining agent not removable with mechanical assistance)

The glass beads used here have a diameter of 0.01 mm-0.75 mm.

| Raw materials | Ex. 1 | Ex. 2 |
|---|---|---|
| CEM I 52.5 | 300 | 300 |
| Quartz sand | 700 | |
| Solid glass spheres | | 700 |
| Polycarboxylate ether | 3 | 3 |
| Water | 135 | 135 |

| Raw materials | Ex. 3 | Ex. 4 | Ex. 5 | Ex. 6 | Ex. 7 | Ex. 8 |
|---|---|---|---|---|---|---|
| Slag sand powder | | | 200 | 200 | 100 | 100 |
| Microsilica | | | 30 | 30 | 50 | 50 |
| Coal fly ash | | | | | 100 | 100 |
| Metakaolin | 200 | 200 | | | 50 | 50 |
| Quartz sand | 800 | | 770 | | 700 | |
| Solid glass spheres | | 800 | | 770 | | 700 |
| Sodium waterglass (modulus 1.5; solids content: 40%) | 350 | 350 | 200 | 250 | 350 | 350 |

| Raw materials | Ex. 9 | Ex. 10 | Ex. 11 | Ex. 12 | Ex. 13 | Ex. 14 |
|---|---|---|---|---|---|---|
| Slag sand powder | | | 200 | 200 | 100 | 100 |
| Microsilica | | | 30 | 30 | 50 | 50 |
| Coal fly ash | | | | | 100 | 100 |
| Metakaolin | 200 | 200 | | | 50 | 50 |
| Quartz sand | 800 | | 770 | | 700 | |
| Solid glass spheres | | 800 | | 770 | | 700 |
| Sodium waterglass powder (modulus 2.1) | 170 | 170 | 120 | 120 | 170 | 170 |
| Water | 170 | 170 | 140 | 140 | 170 | 170 |

Examples 4, 6, 8, 10, 12 and 14 are according to the invention.

Assessment of the tendency of soiling and cleanability:

| | E1 | E2 | E3 | E4 | E5 | E6 | E7 |
|---|---|---|---|---|---|---|---|
| Cleanability | −− | − | + | ++ | + | ++ | + |

| | E8 | E9 | E10 | E11 | E12 | E13 | E14 |
|---|---|---|---|---|---|---|---|
| Cleanability | ++ | + | ++ | + | ++ | + | ++ |

The invention claimed is:

1. Mixture containing an alkali-activated aluminosilicate binder, wherein after hardening, the mixture contains at least 25% by weight of solid glass beads, based on the total mass, wherein the glass beads have a diameter between 0.01 and 5 mm.

2. Mixture according to claim 1, wherein an alkaline activator is at least one compound from the series consisting of sodium waterglass, potassium waterglass, lithium waterglass, ammonium waterglass, sodium hydroxide, potassium hydroxide, sodium carbonate, potassium carbonate, alkali metal sulphates, sodium metasilicate and potassium metasilicate.

3. Mixture according to claim 1, wherein at least one aluminosilicate from the series consisting of the natural aluminosilicates and/or synthetic aluminosilicates is present.

4. Mixture according to claim 1, wherein a ratio of silicon atoms to aluminium atoms is between 30:1 and 1:1.

5. Mixture according to claim 1, wherein the mixture additionally contains at least one filler, plastic, additive and/or pigment component.

6. Mixture according to claim 1, wherein the mixture contains plasticizers and/or superplasticizers in amounts of 0.1 to 3% by weight for reducing the water/binder ratio.

7. Mixture according to claim 1, wherein the mixture comprises a one component system.

8. Mixture according to claim 1, comprising joint filler, joint mortar, screed, coating, render, paint, road marking or anti-graffiti coating.

9. Mixture according to claim 1, wherein the glass beads have a diameter between 0.1 and 1 mm.

10. Process for the preparation of a mixture according to claim 1, comprising homogeneously mixing at least one aluminosilicate, at least one alkaline activator, water and glass beads and optionally further components with one another.

11. Hardened product obtained by the process according to claim 10.

12. Hardened product according to claim 11, wherein the hardened product is a joint filler.

13. A process for reducing the tendency of a joint produced from joint mortar to soil, comprising mixing glass beads in the joint mortar which joint mortar comprises an alkali-activated aluminosilicate binder.

* * * * *